Nov. 11, 1952     G. H. STINSON     2,617,863
ELECTROLYTIC CAPACITOR
Filed Aug. 27, 1949

INVENTOR.
George H. Stinson
BY
Nicholas Lang
ATTORNEY

Patented Nov. 11, 1952

2,617,863

UNITED STATES PATENT OFFICE 2,617,863

ELECTROLYTIC CAPACITOR

George H. Stinson, Indianapolis, Ind., assignor to P. R. Mallory & Co., Inc., Indianapolis, Ind., a corporation of Delaware Application August 27, 1949, Serial No. 112,803

16 Claims. (Cl. 175—315)

This invention relates generally to electrolytic apparatus and has specific application to such apparatus including means and methods for providing electrolytic cells operable over wide temperature ranges.

The operation of electrolytic cells or capacitors substantially depends upon a film which may be formed on the surface of a metal, such as aluminum or tantalum, when immersed in a suitable electrolyte and subjected to electrical current; which film possesses the property of allowing current to flow from an electrolyte to the electrode with little opposition, but of strongly opposing current flow from the electrode to the electrolyte.

The film so formed on the anode material acts as the dielectric for the capacitor and is capable of withstanding very considerable voltages without eruption, and with very inconsiderable current leakage. It is found, however, that this dielectric film is sensitive to heat and that its behavior is greatly dependent thereupon with a direct relation between the sensitiveness of the film to heat and the temperature to which it is subjected in the course of its formation or of its preparation, that is to say, the higher the temperature during formation or preparation of the film, the higher will be the temperature which the film can afterwards withstand without serious impairment of its essential properties.

Heretofore, electrolytic capacitors using tantalum as their film forming anode have not been produced or constructed so as to operate beyond the temperature limits considered normal for aluminum capacitors; i. e. −40° C. to plus 95° C. under optimum conditions. This is so because, in line with what has been stated above, for a tantalum anode to operate in a capacitor at high temperatures it is paramount that it be pre-electro-formed at as high, and preferably a higher, temperature than the subsequent operating temperature of the capacitor. Thus, if the capacitor is to operate at a temperature above 175° C. the anode must be formed at a temperature substantially greater than that temperature. This fact thus necessitated a novel forming process heretofore unavailable but which is now provided by the present invention.

Moreover, in addition to the problem of film forming the anode at temperatures substantially near 200° C. a capacitor operating at these high temperatures must include a suitable cathode material which is insoluble in an electrolyte of the desired concentration at temperatures up to 200° C.; which electrolyte utilized therein should have a low electrical resistance at −60° C. Further in the construction of the capacitor a gasket material is utilized which acts as an electrical insulator that is non-reactive to the electrolyte at this high temperature. The cell or capacitor is also constructed so that it will hold the electrolyte under all desired conditions of temperature and pressure.

By the present invention, therefore, there is provided a compact, self-contained electrolyte cell or capacitor, using a novel tantalum anode which has undergone a novel forming process whereby the electroformation is encompassed in high boiling point sulphuric acid such that the formation is carried out above 100° C., in fact, to temperatures in excess of 175° C. or even to the boiling point of concentrated sulphuric acid. An electrolytic capacitor is thus constructed including all the constructional components desired and which is capable of being operated continuously at a predetermined desired voltage over an ambient temperature range from −60° C. to 200° C. The capacitor, further, is capable of withstanding alternate periods of exposure even beyond these latter temperatures.

It is, therefore, an object of the present invention to provide a novel electrolytic capacitor adapted for use over widely fluctuating temperature ranges including extremes of heat and cold.

Yet another object of the present invention is to provide a novel electrolytic capacitor having a tantalum fabricated anode adapted for use over widely fluctuating temperature ranges.

Still another object of the present invention is to provide a new type of electrolytic capacitor operating over a widely varying range of temperatures including extremes of heat and cold, and which is capable of withstanding these temperatures without losing its seal.

Still another object of the present invention is to provide an electrolytic capacitor unit operating over a widely varying range of temperatures, for example, −60° C. to 200° C., and wherein said capacitor is constructed to overcome pressure variations caused by the expansion and contraction of the various components thereof when the unit is cycled between the aforesaid temperature ranges.

Still another object of the present invention is to provide in a capacitor operating over a wide variation of temperature ranges, a cathode which is insoluble in an electrolyte contained therewithin at temperatures up to 200° C.

Still another object of the present invention is to provide an electrolyte having a low electrical resistance in a tantalum electrolytic capacitor operating between temperatures of —60° C. and 200° C.

A further object of the present invention is to provide an electrolytic capacitor having a suitable container capable of holding an electrolyte under extremes of temperature and pressure.

Still another object of the invention is to provide a tantalum electrolytic capacitor operating over a widely varying range of temperatures, including extremes of heat and cold, with said capacitor including a gasket fabricated of a material capable of acting as an electrical insulator and which is non-reactive with the electrolyte contained within said capacitor at extremes of high temperature, for example, 200° C.

Another object of the present invention is to provide an electrolytic capacitor having a tantalum anode which has undergone a novel electroformation process whereby said capacitor is enabled to operate at high temperatures.

Still another object of the present invention is to provide a novel electroformation process for a tantalum anode in the manufacture of a capacitor capable of operating at high temperatures.

The invention, in another of its aspects, relates to novel features of the instrumentalities described herein for teaching the principal object of the invention and to the novel principals employed in the instrumentalities whether or not these features and principals may be used in the said object and/or in the said field.

Other objects of the invention and the nature thereof will become apparent from the following description considered in connection with the accompanying figures of the drawing and wherein like reference characters describe elements of similar function therein and wherein the scope of the invention is determined rather from the dependent claims.

For illustrative purposes the invention will be described in connection with the accompanying drawing in which:

Figure 1 is a vertical cross section view of an embodiment of the novel tantalum electrolytic capacitor (taken along line 1—1 of Figure 2) capable of operating over wide ranges of temperature, said capacitor including means for overcoming variations in the component assembly of the capacitor caused by expansion and contraction of the various elements included therewithin;

Figure 2 is a sectional plan view of the embodiment of the invention disclosed in Figure 1 and which is useful in showing the compact cell arrangement of the capacitor and illustrating means for providing electrical contact with the anode assembly of the capacitor;

Figure 3 is a vertical sectionalized view of an embodiment of the invention capable of operation over widely varying ranges of temperature and having crimped means for obtaining closure of the several components of the capacitor; and Figure 4 is a vertical cross sectional view of the tantalum electrolytic capacitor invention showing an embodiment providing crimped closure means used in the assembly of the capacitor cell wherein preventive compensating means is used therewith to substantially withstand and overcome variations caused by the expansion and contraction of the various components of the capacitor during the operation thereof.

Generally speaking, the present invention provides an electrolytic capacitor capable of operating over a widely varying range of temperature, for example, —60° C. to 200° C. instead of the heretofore usual range of temperatures of —40° C. to plus 95° C. The capacitor comprises a compact self-contained electrolytic cell adapted to operate continuously at a given voltage throughout the above wide range of temperatures and provides means for withstanding alternate periods of exposure to the lowest and highest temperatures, respectively, without losing its seal. The cathode of the capacitor is constructed of silver and because of the compact arrangement of the cell it may be constructed as the container thereof.

In the construction of the capacitor or cell, a novel electro-formation process is used for the porous tantalum anode so as to provide an anode having a film which may remain undamaged by excessive acid concentration at high temperature and which exhibits low electrical leakage characteristics when operated at voltages of the order of 65 volts at 200° C. temperature.

Referring now to the drawing, Figure 1 is a cross sectional view of an embodiment of the tantalum anode electrolytic cell of the invention wherein reference numeral 10 generally indicates the entire capacitor or cell structure. Capacitor 10 includes a container or casing 11 having a circular or wafer configuration and is adapted for containing the electrolyte of the cell, hereinafter described as being sulphuric acid. Casing 11 is further adapted by the unique construction of the cell to function as an electrode thereof; namely the cathode. Because of the special wide temperature and pressure range demands made upon the cell, the casing is of heavy wall construction and fabricated of fine silver metal.

Cell 10 includes as its second electrode, an anode assembly consisting of cell top 13 made from a tantalum sheet 14 connected to a tantalum pellet 15 fabricated of pressed and sintered metallic tantalum powder. The cell is sealed against electrolytic leakage by means of a main gasket 16 which also functions to electrically insulate the anode assembly from its associated cathode. A second gasket 17 is used to electrically insulate the anode assembly from the case when the assembly is completed. A screw cap 30 fits on the cell case and when tightened holds the components of the cell together to complete the seal. Further, a cap contact ring and lead 40 provides means for a soldered or welded electrical contact with the anode assembly.

In the construction of the electrolyte cell, as above stated, casing 11 has a generally circular or wafer shape. Casing 11 is constructed so as to further the desired aim of providing a capacitor capable of operating over widely varying temperature ranges and of coping with pressures developed and inducted within the cell by these varying temperatures. Because of the high pressure involved due to the operation of the cell at temperatures which may be considerably above the boiling point of the electrolyte used and also because of the pressure caused by the formation gas due to electrical leakage current, a heavy walled case is used. Casing 11 comprises a base section 20 including a bottom portion 21 having an inside wall surface 22 and an outside wall surface 23. A circumferential wall section 24 is connected to bottom 21 and includes side wall segments 25 and 26 with segment 26 including an inside wall 35 and being interconnected to a lip extension 27 adapted to form a seat or stop for interlocking cap 30 as hereinafter described. Segment 26 has an outside surface 28 threaded or serrated so as to provide threads or teeth 29 adapted to mate with the threads or teeth 50 of cap 30. At the top of section 26 there is formed an inwardly extending platform extension comprising a collar 32 and a tongue 33 extending therefrom so as to cooperate with a gasket 16 in the sealing of the electrolytic cell under the stress of varying ranges of temperature and pressures.

Since the electrolytic cell is adapted to operate over widely varying ranges of temperature and since the cell must be extremely compact and self-contained, casing 11 is adapted for use as the cathode electrode of the cell. Further, the cathode is fabricated of a metal found to have especial suitability with the sulphuric acid electrolyte utilized. This sulphuric acid electrolyte has a density of approximately 1.285 at room temperature. This concentration is found to be the optimum electrolytic concentration which works as a compromise between the concentration having the lowest freezing point and that which possesses maximum conductivity. In addition, it is found that sulphuric acid has the lowest freezing point and resistance of many electrolytes tested and examined.

As stated, it is desired that the cathode material which acts as the cell container be such that it remain insoluble in the desired electrolyte of a determined concentration at temperatures up to 200° C. It is found that although silver is readily soluble in hot concentrated sulphuric acid, it is only mildly attacked by solutions containing 50% sulphuric acid at the boiling point of the solution. Thus the cathode of the cell is fabricated of silver with the container or casing constructed as a fine silver cell case. In addition, to the above great advantage, silver also has the advantage of being readily electroplated at extremely low current densities. This fact tends to limit the corrosion and reduce the cathode polarization for a capacitor operated with an applied alternate current ripple voltage.

The anode structure of cell 10 is an assembly consisting of a cell top 13 made from a tantalum metal sheet 14 and an tantalum pellet 15 made from pressed and sintered tantalum metallic powder. The sintered pellet 15 may be spot welded or otherwise formed by suitable connecting means 51 to the tantalum top. The entire assembly forms the anode of the capacitor cell and also acts as the top thereof.

Because of the widely varying temperature and pressure needs the capacitor is constructed with a special electroformed tantalum anode. It was discovered after great experimentation with plain tantalum foil, and later with pellets made from pressed and sintered metallic tantalum, that when the tantalum anode was electroformed to the 120 volts D. C., at temperatures of approximately 200° C. in sulphuric acid electrolytes, the anode had novel electrical characteristics with respect to capacitance, direct current leakage and equivalent series resistance throughout the temperature range of −60° C. to 200° C.

However, the electroformation process posed great difficulties, for it was found that the optimum maximum formation temperature was approximately 175° C. Further, it was considered desirable to complete the formation of the anode at temperatures somewhat in excess of 200° C.

Since the formation process is carried out in an open vessel or tank, it is seen from the previous discussion that the sulphuric acid electrolyte employed must be of sufficient concentration to have a boiling point equal to or in excess of the maximum temperature desired. For example, sulphuric acid solution containing 72% $H_2SO_4$ has a boiling point of approximately 175° C.; and for 200° C., the concentration is about 79% sulphuric acid.

Further, when formation of the anodes was carried out at 190° C. in 75% sulphuric acid, it was found almost impossible to age capacitors at 65 volts per cell at 200° C. to a leakage of less than .7 ma. It thus may be concluded that the concentration of acid at 190° C. is sufficiently high to produce permanent damage to the oxide film. Again, units formed at 175° C. in 72% acid may be aged to 65 volts per cell at 200° C. to a leakage of less than .5 ma. in approximately 48 hours.

In the present novel method of making the tantalum cell, the anodes are formed to 120 volts at 175° C. and assembled into units. The individual units are then aged at 200° C. with a maximum leakage of 2 ma. per cell during the early stages of the aging process and then at a maximum of 1 ma. per cell until the leakage has reached 0.5 ma. per cell.

The electrolyte used in a completed cell consists of 39% sulphuric acid with a boiling point of approximately 108° C. When this electrolyte is heated to 200° C. in the cell, a vapor pressure of nearly 200 lbs./sq. in is obtained. The cell is so constructed as to withstand this pressure for long periods of time and in addition withstand increased pressure due to gas formation produced by the leakage current during operation. Moreover, if the leakage current exceeds 1 to 2 ma. for long periods of time during aging and subsequent use, the effective life in service may be materially reduced. Again, leakage current during operation tends to increase the strength or effective thickness of the dielectric film with a subsequent reduction in capacitance. It is, therefore, essential that the unit be aged and operated at the lowest electrical leakage possible.

In order to avoid a long period of aging at high temperature, the forming operation is carried out in several steps. In the first step, the anodes are formed in an open tank to 120 volts at a maximum temperature of 135° C. in 60% sulphuric acid electrolyte. When formation is sufficiently complete to insure minimum gas generation at the anode and cathode at the temperature and voltage specified, the anode is then transferred to a 40% sulphuric acid solution in a container which is made pressure tight. The formation is then carried out to 120 volts at gradually increased temperatures up to 200° C. or higher until a leakage of 0.5 ma. or less per anode at 65 volts is obtained.

By the above method, anodes are produced having a film undamaged by excessive acid concentration at high temperature and exhibiting low electrical leakage characteristics when operated at 65 volts and 200° C. It is to be noted, that in the above description of the process where leakage values are given, they refer to eight gram tantalum pellets having a density of 135 g./in$^3$ and a capacitance of approximately 50 mfd. when formed to 120 v. D. C.

The anode assembly, comprising tantalum sheet 14 and pellet 15, is insulated from the cathode wall structure of the cell by means of a gasket 16, whose cross section has a wave-like appearance. Gasket 16 obtrudes between the cathode and anode structures of the cell and fits between cap 30 on collar 32 and tongue 33 of cathode section 26. The gasket is fabricated of a material suitable from the standpoint of corrosion resistance and high temperature characteristics, for example, polytetra-fluoroethylene polymer.

Since the gasket material tends to flow under pressure, it is apt to lose its seal unless confined in such wise as to retard flow in at least one portion of the seal. Therefore, the tantalum top, the gasket and top of the cell, it will be noted, have been constructed that when the unit is sealed a portion of the gasket material will always be confined under sufficient pressure to maintain an effective seal.

Further, due to the unequal expansion and contraction of the components confining the capacitor it is found that a cell which may not leak electrolyte when maintained at high temperatures for long periods of time and cooled only to room temperature, may leak when subjected to successive periods of operation at temperatures from −60° C. and 200° C. To prevent electrolyte leakage during such cycling a heavy spring washer 18 is provided between the overlying screw cap 30 and underlying insulating washer or gasket 17, and a contact ring and tab 40 which makes contact with the anode assembly of the capacitor.

As stated, the anode is pre-electroformed. In order to pre-electroform the anode assembly a tantalum contact must be made with the tantalum top and anode assembly. This is accomplished by spot welding a tab of tantalum ribbon to the cell top. Since tantalum cannot be soldered to itself or to other metals, this tab used in the formation is broken off and a contact ring and tab 40 is connected to the anode assembly and serves as the anode lead. It is held securely in place by the overlying steel spring washer 18, described above.

Further, since spring washer 18 in contact with screw cap 30, if otherwise not prevented, will make electrical contact with contact ring and tab 40, which ring and cap are electrically a part of the anode circuit, an insulator in the form of a mica washer 17 is provided to electrically insulate tab 40 and the anode assembly from the cathode circuit of the capacitor. For this purpose a mica washer having high compression and high electrical breakdown strength is used.

When the capacitor is continuously operated over long periods of time at high temperatures, the high pressure developed thereby causes a continuous escape of vapor from the cell. Since the tight construction of the cell at 200° C. is such as to prevent loss of electrolyte, there will only be a weight loss of approximately .05 to 0.1 milligram per hour. This loss, although insufficient to affect the operation of the capacitor, may, it is found, work to an advantage, inasmuch as it tends to relieve excess internal pressures and prevents bulging of the capacitor top during long continuous operation thereof at high temperatures.

Referring now to Figure 3, there is shown an embodiment of the invention wherein the electrolyte capacitor has a crimp type closure instead of the screw type closure of Figure 1. The crimp closure structure is so constructed that the casing may be of light weight and small size yet is still capable of developing a seal which does not leak when cycled between the lowest and highest temperatures in the desired operating range.

In this embodiment a bimetal steel and silver drawn cup is used as the container for the electrolyte and for the cathode of the capacitor of the cell. The cell top and anode assembly comprises a drawn tantalum sheet to which may be spot welded a tantalum pellet anode formed of pressed and sintered metallic powder. As previously stated, a gasket made of polytetra-fluoroethylene polymer is used for the seal. This gasket seals the cell against electrolyte leakage and electrically insulates the anode and cathode assemblies.

The electrolytic capacitor, having a crimp type closure, is generally designated by reference numeral 60, and has a bimetal casing 61 fabricated of a steel layer 62 and a silver layer 63 with the silver layer, adapted as formerly, to make contact with a sulphuric acid electrolyte 64. Thus, silver layer 63 is adapted to act as an electrode and becomes the cathode of the capacitor. The anode assembly, comprises a sheet of tantalum metal 65 suitably joined to a pellet made from pressed and sintered metallic tantalum powder 66.

Case 61, made of a bimetal sheet of steel and silver, is constructed with a horizontal wall section 67 and a vertical side wall section 68 which provides a flat shoulder 71 around the top of the wafer shaped capacitor. The outer wall section 68 is drawn down, as shown, to have a J-shaped cross sectional configuration 69. The tantalum top of the cell is in the form of a cup having tantalum anode pellet 66 properly centered therein joined, as by inside welding, to tantalum member 65 having arcuate sections 73, 74, 75. A ridge 70 is formed into the inside of the anode cup so as to be positioned directly opposite the shoulder 71 of the casing during assembly thereof.

Gasket 72, as stated, is made of polytetrafluoroethylene polymer, and is cold drawn to slip over the anode pellet 66 and to fill the interstices between the J-shaped section 69 of casing 61 and the arcuate sections 73—75 of the tantalum sheet 65. In assembly the cell electrolyte of sulphuric acid is introduced into the case, the anode assembly is pressed on to the case and sealed by crimping. The gasket 72 is thus confined under sufficiently high pressure to affect a seal able to withstand repeated cycling between the extremes of the desired operating temperature range.

In Figure 4, an embodiment of the invention is shown, wherein the electrolytic capacitor is shown as being a modification of the invention described with respect to Figure 3, wherein means are afforded to allow temperature compensation in the structure there disclosed. In addition, the cathode electrode, formed by a casing wall, may be depressed so as to afford substantially continuous contact therebetween and a desired electrolyte. As in Figure 3, electrolytic cell 80 has a casing wall 81 made from a bimetal strip, here shown as being constructed of a thickness of steel 86 and silver 82.

In the construction of capacitor or cell 80, a drawn tantalum metal cup 83 is provided, wherein tantalum powder 84 is pressed and sintered. The pressed tantalum powder structure and the tantalum metal cup constitute the anode assembly of the capacitor. The pressed tantalum anode consists of pressed and sintered tantalum powder passing 250 mesh and retained on 325 mesh. It has a pressed density of 135 g. per cubic inch and weighs 9.4 grams. The drawn cup 83 and the sintered tantalum 84 may be spot welded to assure positive metallic contact therebetween. Cell 80 is provided with a top or cover 85, which as stated, may be made of a steel and silver bimetal, or if desired made by drawing a steel disc and a silver disc placed together in a die. In any event, the cover is constructed so that the silver becomes the inside surface. Further, cover 85 is adapted to act as the cathode of capacitor 80, and has its center 86 depressed so as to provide substantially continuous contact between the cathode and its contiguous electrolyte, which may be a predetermined concentration of sulphuric acid. Again, gasket 87, which as formerly, is fabricated of a material not attacked by strong sulphuric acid at approximately 200° C., and which may be made of polytetra-fluoroethylene polymer is electrically insulatively interposed in bracket-like fashion between the silver thickness 82 of the cathode and the anode assembly. Gasket 87 may be punched from sheet stock and cold formed to fit to cover 85.

Between anode cup 83 and gasket 87 there is interposed insulating washer 88 and steel spring washer 89. Insulating washers 88 may be formed of a suitable insulating material, for example, mica, which will not flow under pressure or a combination of heat and pressure and which will maintain its electrical insulating properties over a wide temperature range extending over approximately —60° C. to 200° C. Insulating washer 88 is adapted to insulate anode cup assembly 83 from spring washer 89 and portions of the cathode circuit. Further, steel spring washer 89 is constructed so as to maintain pressure around the seal when the capacitor is subjected to alternate periods of high and low temperature operation within the operating range of the capacitor.

Tantalum cup 83 is constructed so that its top edge 90 is crimped over to form a support for the gasket and cover. It is to be noted, in the assembly of parts, that cover 85 is constructed with a slight taper so that the top and gasket assembly may be easily slipped over the anode assembly and permit the escape of air as the top assembly is sealed. Insulating gasket or washer 88 and spring washer 89 are all positioned and the cover is crimped to seal the capacitor or cell. Further, the closing die draws the cover with a slight taper toward the center and crimps the edge thereof over the spring washer with sufficient pressure to compress the spring metal until it is nearly flat.

The compensated crimped type of closure, above described, provides a capacitor structure which is sealed sufficiently to permit cycling throughout a temperature range substantially of the range of —60° C. to 200° C. Because of the unique structural configuration of the anode assembly, there is a saving in the amount of tantalum required for the cell, with the construction thereof being such that the internal resistance paths in the sintered tantalum structure are shortened so as to improve the resistance characteristics of the cell. Further, the novel construction of the anode cup permits a more positive control of electrolyte dispensing and allows for additional electrolyte capacity which aids in reducing the equivalent series resistance of the cell. There is thus also provided a rugged anode assembly which is capable of withstanding great mechanical shock without breaking the bond between the tantalum case and its associated sintered tantalum anodic structure. Moreover, a novel seal is established which affords a substantially greater sealing area which assures great sealing effectiveness.

The electrolytic capacitor of the present invention operating over wide ranges of temperature and pressure, as herein above described, is merely illustrative and not exhaustive in scope and since many widely different embodiments of the invention may be made without departing from the scope thereof, it is intended that all matter contained in the above description and shown in the accompanying drawing shall be interposed as illustrative and not in a limiting sense.

What is claimed is:

1. An electrolytic capacitor adapted to operate over a wide range of temperatures comprising a container acting as a silver cathode therefor, an anode placed in said container, said anode being constructed of a sheet of tantalum and a pellet connected thereto and being electrically insulated from said cathode, said pellet being fabricated of pressed and sintered metallic tantalum powder, an electrolyte contiguous with said cathode and said anode, means for maintaining the seal of said capacitor at high temperatures and pressures, said means including a gasket fabricated of a material inert to said electrolyte at high temperatures contiguously placed between said sheet and said cathode, and means confining said gasket material under pressure to maintain said capacitor seal.

2. An electrolytic capacitor adapted to operate over a wide range of temperatures comprising a silver casing therefor, said casing adapted to act as the cathode of said capacitor, said pellet being fabricated of pressed and sintered metallic tantalum powder, an anode assembly comprising a sheet of tantalum having a tantalum pellet connected thereto contained within said casing, said assembly being electrically insulated therefrom, a sulphuric acid electrolyte contiguous with said anode and said casing, seal means for sealing said capacitor at high temperatures and pressures, said sealing means fabricated of a polytetra-fluoroethylene polymer material contiguously placed between said tantalum sheet and said cathode, and means for confining said gasket under pressure to maintain the effective seal of said capacitor.

3. An electrolytic capacitor adapted to operate over a wide range of temperatures comprising a casing therefor, said casing fabricated of silver and adapted to act as the cathode of said capacitor, an anode assembly contained within said casing and being electrically insulated from said cathode, said assembly comprising a tantalum metal sheet and a pellet fabricated of pressed and sintered metallic powder connected thereto, a sulphuric acid electrolyte contiguous with said anode and said casing, and means for maintaining the seal of said capacitor at high temperatures and pressures, said means including a gasket fabricated of a material inert to said electrolyte at high temperatures.

4. An electrolytic capacitor adapted to operate over a wide range of temperatures comprising a silver casing acting as the cathode thereof, an anode assembly contained within said casing including a tantalum sheet and a pellet fabricated of pressed and sintered metallic tantalum powder, an electrolyte having a concentration of about 39% sulphuric acid placed next said cathode and said anode, and means for maintaining the seal of said capacitor at high temperatures and pressures, said means including a gasket fabricated of a polytetra-fluoroethylene polymer material contiguously placed between said sheet and said cathode.

5. An electrolytic capacitor adapted to operate over a wide range of temperatures comprising a casing fabricated of silver acting as a cathode thereof, a tantalum anode comprising a sheet of tantalum to which is connected a tantalum pellet contained within said casing, said anode being electrically insulated therefrom by means of a gasket fabricated of polytetra-fluoroethylene polymer material, a sulphuric acid electrolyte contiguous with said casing and said anode, and sealing means for said capacitor maintaining the seal thereof at high temperatures, said sealing means including means for confining a portion of said gasket material under pressure.

6. An electrolytic capacitor adapted to operate over a wide range of temperatures comprising a silver container acting as a cathode thereof, an anode assembly including a sheet of tantalum connected to a pellet fabricated of pressed and sintered tantalum powder within said container, an electrolyte contiguous with said cathode and said anode, screw means for maintaining the seal of said capacitor at high temperatures and pressures, said screw means including a base, a cap screwable thereon and a gasket fabricated of a material inert to said electrolyte at high temperatures.

7. An electrolytic capacitor adapted to operate over a wide range of temperatures comprising a casing having a wall fabricated of heavy silver material, a tantalum anode placed within said casing, a sulphuric acid electrolyte interposed between said casing and said anode, sealing means for said capacitor to maintain the seal thereof at high temperatures and pressures, said sealing means comprising a silver base, a cap interlockably threadable thereupon and, a gasket fabricated of a material inert to said electrolyte interposed between said casing and said anode so as to electrically insulate the same and to aid in the effective seal of said capacitor at high temperatures.

8. An electrolytic capacitor adapted to operate over a wide range of temperatures comprising a cathode constructed of a threaded silver base and a cap threadably connected thereon, an anode fabricated of tantalum contained within said cathode, an electrolyte interposed therebetween, an electrically insulated gasket interposed between said anode and said cathode so as to insulate the same and to aid in the sealing of said capacitor at high temperatures.

9. An electrolytic capacitor adapted to operate over a wide range of temperatures comprising a container fabricated of a threaded silver base, a tantalum anode including a pellet fabricated of pressed and sintered metallic tantalum powder contained therewithin, an electrolyte contiguous with said anode and said container, a gasket fabricated of a material inert with respect to said electrolyte interposed between said anode to electrically insulate the same, tab means connected to said anode to act as a positive terminal therefor, a mica washer overlying a portion of said tab means connected to said anode and a screw cap means placed over said mica washer and screwably connected to said base of said capacitor for maintaining the seal of the same at high temperature ranges.

10. An electrolytic capacitor adapted to operate over a wide range of temperatures comprising a container fabricated of a threaded silver base, a tantalum anode including a pellet fabricated of pressed and sintered metallic tantalum powder included therewithin, an electrolyte contiguous with said anode and said container, a gasket fabricated of a material inert with respect to said electrolyte interposed between said anode and cathode to electrically insulate the same, tab means connected to said anode to act as a positive terminal therefor, a mica washer overlying a portion of said tab means connected to said anode, screw cap means placed over said mica washer, and a washer made of steel spring overlying said tab means to maintain pressure thereupon.

11. An electrolytic capacitor adapted to operate over a wide range of temperatures comprising a silver container acting as a cathode therefor, a tantalum anode comprising a tantalum sheet and a pellet of sintered and pressed tantalum powder connected thereto placed therewithin, said anode being electrically insulated therefrom, an electrolyte contiguous with said cathode and said anode, and crimp means for maintaining the seal of said capacitor at high temperatures and pressures, said crimp means having a J-shaped cross sectional configuration and including a gasket made of polytetra-fluoroethylene polymer material for insulating said container from said anode structure and to aid in maintaining an effective seal for said capacitor at high temperatures.

12. An electrolytic capacitor adapted to operate over a wide range of temperatures comprising a bimetal container fabricated of steel and silver layers, said layer of silver adapted to act as the cathode of said capacitor, an anode fabricated of tantalum metal placed in said container, said anode including a pellet fabricated of pressed and sintered metallic tantalum powder, an electrolyte interposed between said cathode and said anode, and crimp means including a gasket made of material inert with respect to said electrolyte for electrically insulating said cathode from said anode and to aid in maintaining the seal of said capacitor at high temperatures and pressures.

13. An electrolytic capacitor comprising a casing fabricated of a bimetal sheet of layers of steel and silver, a top of said casing made of tantalum material, said top being in the form of a cup and including an interconnected tantalum anode pellet and said top further having a ridge formed therein, an electrolyte interposed between said tantalum pellet and said silver layer of said casing, and means interposed between said cup shaped tantalum top and said casing to electrically insulate the same and to aid in the formation of an effective seal for said cup, said material interposed between said top and said casing comprising a material inert with respect to said electrolyte.

14. An electrolytic capacitor adapted to operate over a wide range of temperatures comprising a casing fabricated of a bimetal sheet having layers of steel and silver, said bimetal casing adapted to act as the cathode thereof, an electrolyte, a tantalum anode contained within said casing comprising a tantalum cup and a pressed tantalum powder structure connected to said cup.

15. An electrolytic capacitor adapted to operate over a wide range of temperatures comprising a casing fabricated of a bimetal sheet having layers of steel and silver, said bimetal casing adapted to act as the cathode thereof, a tantalum anode contained within said casing comprising a tantalum cup and a pressed tantalum powder structure connected to said cup, an electrolyte interposed between said tantalum assembly and said silver layer of said casing, a steel spring washer placed underneath said tantalum cup, a mica washer interposed between said tantalum cup and said steel spring washer, and an insulative material interposed between said anode cup and said steel washer to electrically insulate said tantalum cup from said silver layer of said cathode and crimp means providing a seal with said bimetal casing being further crimped about said material electrically insulating said silver layer from said anode cup so as to maintain effective seal for said cup.

16. An electrolytic capacitor adapted to operate over a wide range of temperatures comprising a bimetal casing fabricated of layers of steel and silver adapted to act as the cathode thereof, an anode comprising an anode cup and an anode pellet contained within said casing, a electrolyte placed within said anode cup, a depression formed within said bimetal casing to make contact with said electrolyte whereby said silver layer is in intimate association therewith, means insulating said casing from said anode cup, said means including a gasket fabricated of polytetrafluoroethylene polymer material, and pressure compensating means placed underneath said anode cup comprising a mica washer and a steel spring washer, said casing being crimped about said insulative material to form a seal for said capacitor.

GEORGE H. STINSON.

REFERENCES CITED

The following references are of record in the file of this patent:

UNITED STATES PATENTS

| Number | Name | Date |
|---|---|---|
| 1,753,912 | Woodhull | Apr. 8, 1930 |
| 1,914,114 | Estes | June 13, 1933 |
| 1,934,515 | Tyzzer | Nov. 7, 1933 |
| 2,037,848 | Brennan | Apr. 21, 1936 |
| 2,060,866 | Hetenyi | Nov. 17, 1936 |
| 2,104,019 | Brennan | Jan. 4, 1938 |
| 2,162,385 | Langguth | June 13, 1939 |
| 2,299,228 | Gray | Oct. 20, 1942 |
| 2,357,554 | Sears | Sept. 5, 1944 |
| 2,359,970 | Clark | Oct. 10, 1944 |
| 2,368,688 | Taylor | Feb. 6, 1945 |